US011150749B2

(12) United States Patent
Keidar et al.

(10) Patent No.: US 11,150,749 B2
(45) Date of Patent: Oct. 19, 2021

(54) CONTROL MODULE FOR STYLUS WITH WHITEBOARD-STYLE ERASURE

(71) Applicant: Microsoft Technology Licensing, LLC, Redmond, WA (US)

(72) Inventors: Itay Keidar, Kfar Saba (IL); Jonathan Golan, Alonie Abba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 15/461,392

(22) Filed: Mar. 16, 2017

(65) Prior Publication Data

US 2018/0267633 A1 Sep. 20, 2018

(51) Int. Cl.
*G06F 3/0354* (2013.01)
*G06F 3/038* (2013.01)
*G06F 3/0488* (2013.01)

(52) U.S. Cl.
CPC .......... *G06F 3/03545* (2013.01); *G06F 3/038* (2013.01); *G06F 3/04883* (2013.01); *G06F 2203/04807* (2013.01)

(58) Field of Classification Search
CPC .... G06F 3/03545; G06F 3/044; G06F 3/0383; G06F 2203/04108; G06F 3/038; G06F 2203/04807
See application file for complete search history.

(56) References Cited

U.S. PATENT DOCUMENTS

| | | | |
|---|---|---|---|
| 7,486,282 B2 | 2/2009 | Russo | |
| 8,482,539 B2 | 7/2013 | Ogawa et al. | |
| 9,116,557 B2 | 8/2015 | Lee et al. | |
| 9,329,706 B2 | 5/2016 | Kawasaki et al. | |
| 9,417,717 B2 * | 8/2016 | Hsiang | G06F 3/041 |
| 2007/0139399 A1 | 6/2007 | Cook | |
| 2007/0146351 A1 | 6/2007 | Katsurahira et al. | |
| 2009/0273585 A1 * | 11/2009 | De Haan | G06F 3/03545 345/179 |
| 2009/0277697 A1 | 11/2009 | Bolt et al. | |

(Continued)

FOREIGN PATENT DOCUMENTS

| | | |
|---|---|---|
| CN | 201149685 Y | 11/2008 |
| WO | 2005024544 A2 | 3/2005 |

OTHER PUBLICATIONS

"Microsoft Surface Pen with two side buttons", https://www.microsoft.com/surface/en-us/support/touch-mouse-and-search/surface-pen?os=windows-10&=undefined, Retrieved on: Jan. 18, 2017, 7 pages.

(Continued)

*Primary Examiner* — Stephen G Sherman (57) ABSTRACT

An electronic device has a sensor panel and a display upon which content is rendered in use. A control module controlling the sensor panel enters a whiteboard-style erase mode when specified conditions are met. The control module is configured to, in the whiteboard-style erase mode detect a first position on the sensor panel of a first point on a stylus; detect a second position on the sensor panel of a second point on the stylus, the second point being spaced from the first point; compute the location of the longitudinal axis of the stylus on the sensor panel from at least the detected first and second positions; and trigger an update of the rendered content at a location on the display related to the location of the longitudinal axis of the stylus on the sensor panel.

20 Claims, 7 Drawing Sheets

(56) References Cited

U.S. PATENT DOCUMENTS

| | | | |
|---|---|---|---|
| 2012/0086675 A1 | 4/2012 | Raif et al. | |
| 2013/0106724 A1* | 5/2013 | Pedersen | G06F 3/0346 345/173 |
| 2014/0062969 A1 | 3/2014 | Chang et al. | |
| 2014/0146003 A1* | 5/2014 | Jang | G06F 3/03545 345/174 |
| 2014/0168177 A1* | 6/2014 | Mkrtchyan | G06F 3/03545 345/179 |
| 2014/0210748 A1* | 7/2014 | Narita | G06F 3/0354 345/173 |
| 2015/0054791 A1 | 2/2015 | Omura | |
| 2016/0098186 A1 | 4/2016 | Sugiura | |
| 2018/0095552 A1* | 4/2018 | Li | G06F 3/03542 |

OTHER PUBLICATIONS

"Using Surface Pen with single button on flat edge", https://www.microsoft.com/surface/en-in/support/hardware-and-drivers/surface-pen-pro-4, Retrieved on: Jan. 18, 2017, 6 pages.

\* cited by examiner

CONTROL MODULE FOR STYLUS WITH WHITEBOARD-STYLE ERASURE

BACKGROUND

Styluses are used with sensor panels that are integrated with a display screen such as a touch screen. Stylus position is sensed by the sensor panel and used to provide input to a computing device associated with the display screen, when the writing tip of the stylus is touching or hovering over a detection surface of the sensor panel. In this way a user is able to draw on the touch screen or make handwriting input for example.

Styluses are used to erase content displayed on a touch screen by using an eraser end of the stylus. For example, an eraser end of the stylus is opposite a writing tip of the stylus. When the eraser end of the stylus is detected on the sensor panel the detected input is used to erase content rendered at a position on the display screen corresponding to the location of the eraser end of the stylus.

The embodiments described below are not limited to implementations which solve any or all of the disadvantages of known styluses and/or sensor panels.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples, an electronic device has a sensor panel and a display upon which content is rendered in use. A control module controlling the sensor panel enters a whiteboard-style erase mode when specified conditions are met. The control module is configured to, in the whiteboard-style erase mode detect a first position on the sensor panel of a first point on a stylus; detect a second position on the sensor panel of a second point on the stylus, the second point being spaced from the first point; compute the location of the longitudinal axis of the stylus on the sensor panel from at least the detected first and second positions; and trigger an update of the rendered content at a location on the display related to the location of the longitudinal axis of the stylus on the sensor panel.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In the present document the term "touch input" is used to refer to direct contact by an input medium (such as a finger-tip or stylus/pen) with a sensor panel and also to input events where an input medium comes into close physical proximity to the sensor panel whereby a change in capacitance is detectable at a position on the sensor panel.

Existing approaches for erasing electronic ink on a touch screen typically involve using an eraser end of a stylus to select regions of the electronic ink to be erased. This is time consuming and burdensome for the end user to control the electronic device in cases where large areas of electronic ink are to be erased. The end of the stylus is often relatively tiny compared with the area to be erased. Even where the erase footprint of the stylus is magnified around the location of the end of the stylus on the display the end user finds it difficult to erase simply and effectively. This is an increasing issue with the more widespread use of electronic whiteboards in meeting rooms, smart televisions with touch screens and other large touch screen devices.

Figure 1:
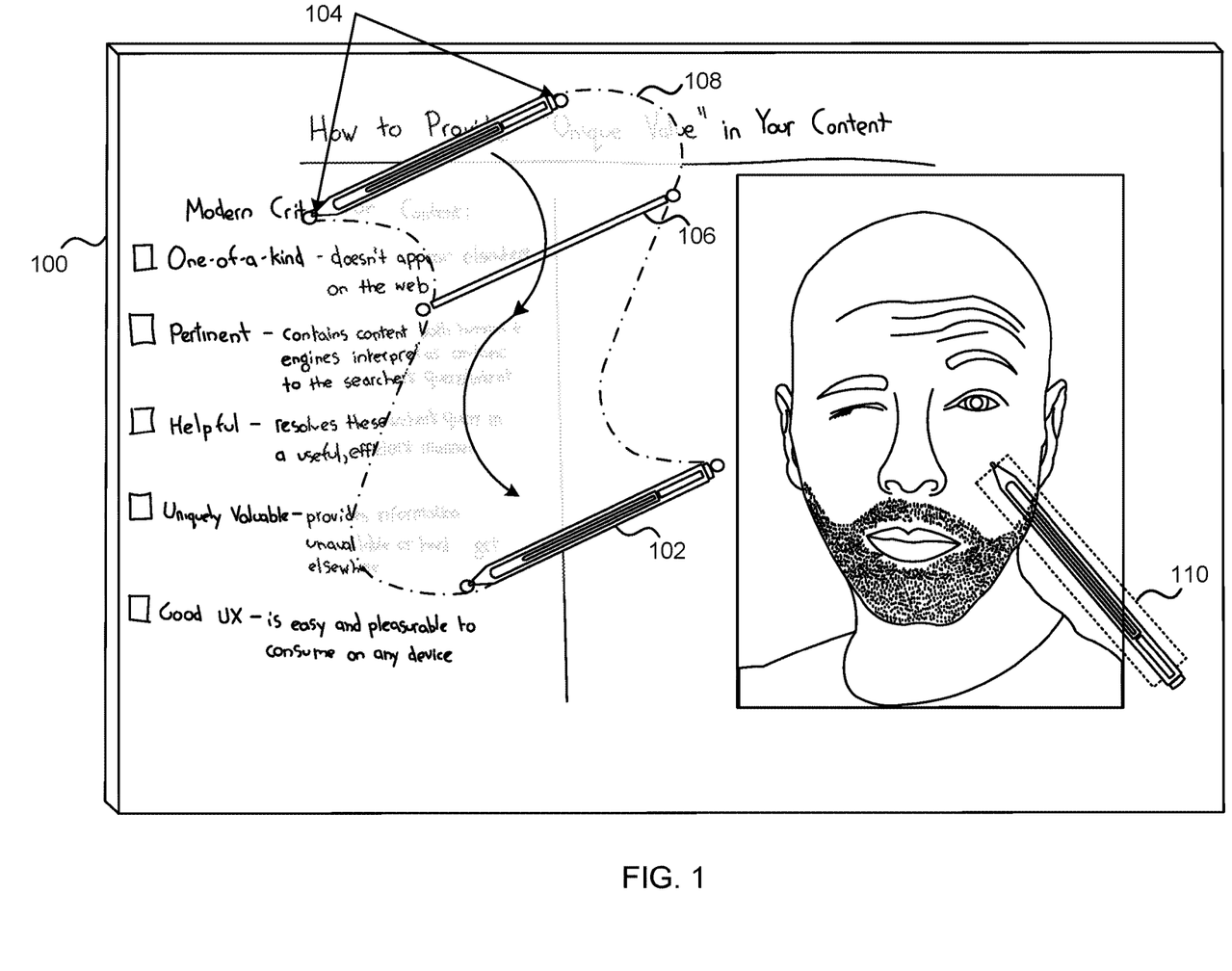
FIG. 1 is a schematic diagram of an electronic whiteboard upon which electronic ink handwriting and drawings are present, and which showing a stylus being used to erase part of the electronic ink.

FIG. 1 is a schematic diagram of an electronic whiteboard 100 upon which electronic ink handwriting and drawings are present, and which shows a stylus 102 being used to erase part of the electronic ink. A user (not visible in FIG. 1 for clarity) places the stylus on the electronic whiteboard 100 by lying the stylus on the surface of the electronic whiteboard 100 with the length of the stylus body touching the electronic whiteboard 100 or hovering above it close enough to be detected by the electronic whiteboard 100. The user moves the stylus over the surface or major face of the electronic whiteboard whilst keeping the longitudinal axis of the stylus substantially parallel with the major face of the electronic whiteboard 100. This action is intuitive to the user since it is akin to using a conventional whiteboard eraser. FIG. 1 illustrates an example of the motion of the stylus over the major face of the electronic whiteboard 100 by the curved arrow and by showing the electronic ink under the path 108 of the stylus as partly erased. In the example of FIG. 1 a faint version of the electronic ink under the path 108 of the stylus is visible although in some examples the electronic ink is completely erased. In this way a user is able to quickly and simply erase large areas of electronic ink on the electronic whiteboard 100.

The stylus has a tip and a tail 104 and is shown at intermediate position 106 along path 108 as well as at the start and end of the path, in order to indicate the motion of the stylus graphically. In some cases the user sees a preview of the erasure area 110 before the erasing takes place. For example, the erasure area is shown graphically on the electronic whiteboard 100 as a rectangular region around the longitudinal axis of the stylus. When the user makes an indication, such as a voice command, stylus button press or other input, the electronic ink within the rectangle is removed or made less intense.

Figure 2:
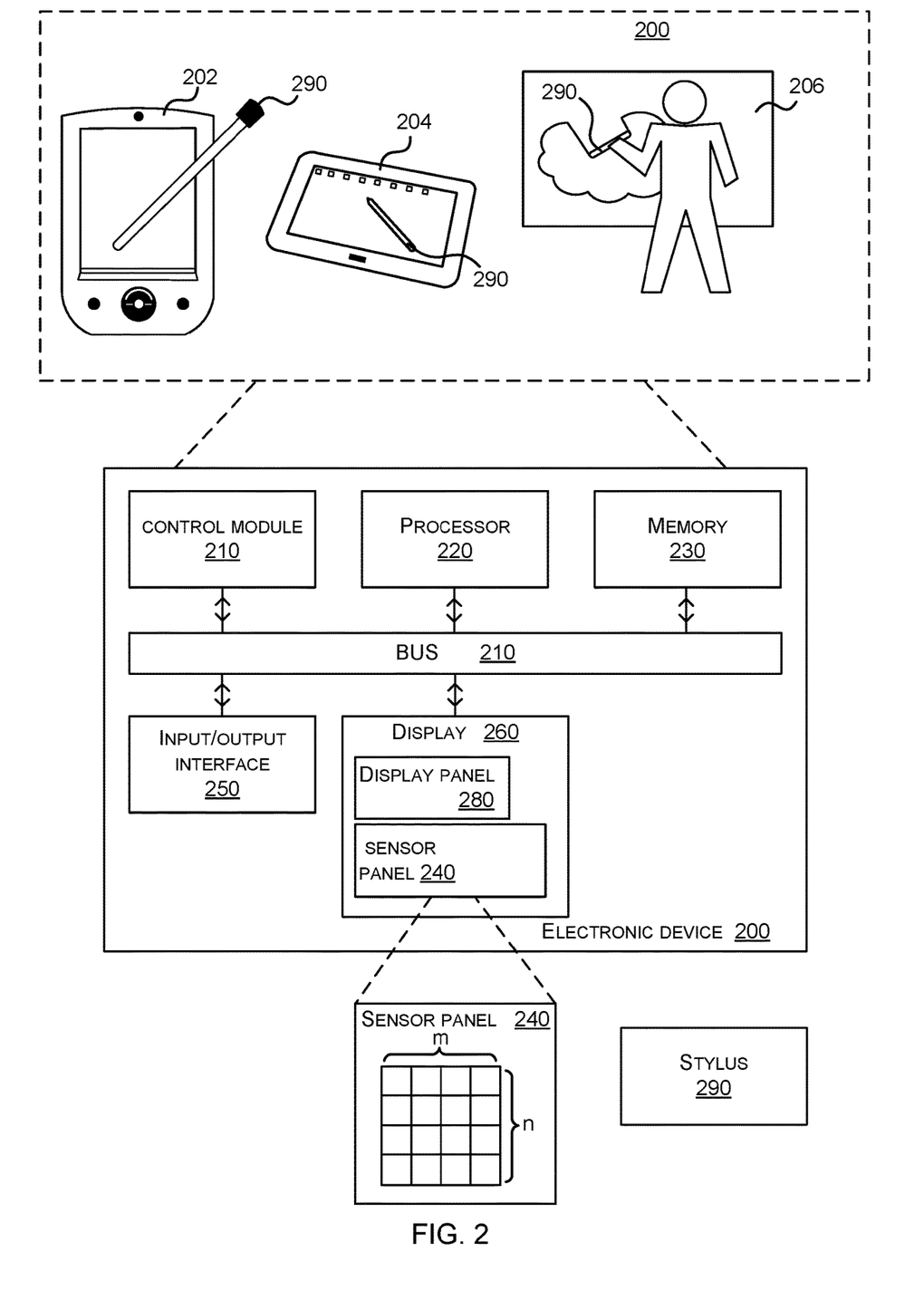
FIG. 2 is a schematic diagram of an electronic device having a sensor panel and associated display and showing a stylus for use with the electronic device.

FIG. 2 is a schematic diagram of an electronic device 200 having a sensor panel 240 and associated display 260 and showing a stylus 290 for use with the electronic device 200.

The electronic device 200 is a smart phone 202, tablet computer 204, electronic whiteboard 206, touch screen television or any other type of electronic device with a sensor panel 240. The electronic device has at least one processor 220, a memory 230, a control module 210 for controlling the sensor panel 240, an input output interface 250, a display 260 comprising a display panel 280 and the sensor panel 240 and a bus 210 interconnecting the components. Content is rendered on the display in use. That is, during operation of the display by the electronic device, content such as drawings, text, electronic ink, images, videos, or other content, is displayed on the display. When the electronic device is powered off, the display may be powered off also so that content is not rendered on the display when it is powered off. The input/output interface 250 is configured to control outputs from the electronic device 200 and for to control inputs received at the electronic device 200. The display 260 comprises a display panel 280 which may be located in front of or behind the sensor panel 240 such as in a conventional smart phone, tablet computer, or smart watch.

The sensor panel 240 comprises a first array of electrodes (m in FIG. 1) arranged substantially parallel with one another and a second array of electrodes (n in FIG. 1) arranged substantially parallel with one another. In some implementations the electrodes in the first array are row electrodes positioned substantially perpendicular to the electrodes in the second array (column electrodes) to form a grid or matrix. While the row electrodes may be referred to as transmit electrodes and the column electrodes may be referred to as receive electrodes, these designations may be reversed with no change in meaning. However, it is not essential for the electrodes to be arranged in a grid. In some cases the row electrodes intersect each column electrode at an at angle that is not perpendicular thereby forming a sensor having the form of a parallelogram. In some cases the electrodes form a more complex pattern in which any two rows or columns are not necessarily parallel, or not necessarily laid out along straight lines.

Where the sensor panel is used in front of or within a display 260 (such as a liquid crystal display) the sensor panel 240 is substantially transparent to visible wavelengths of light. Specifically, the electrodes in the sensor panel are made from transparent conductive material (for example, indium tin oxide), or alternatively, are made from opaque material but with traces so small as to be inconspicuous).

The sensor panel 240 is used to measure the capacitance from each row to each column of the electrodes in order to measure the position of an input medium such as a finger, or stylus 290.

Figure 3:
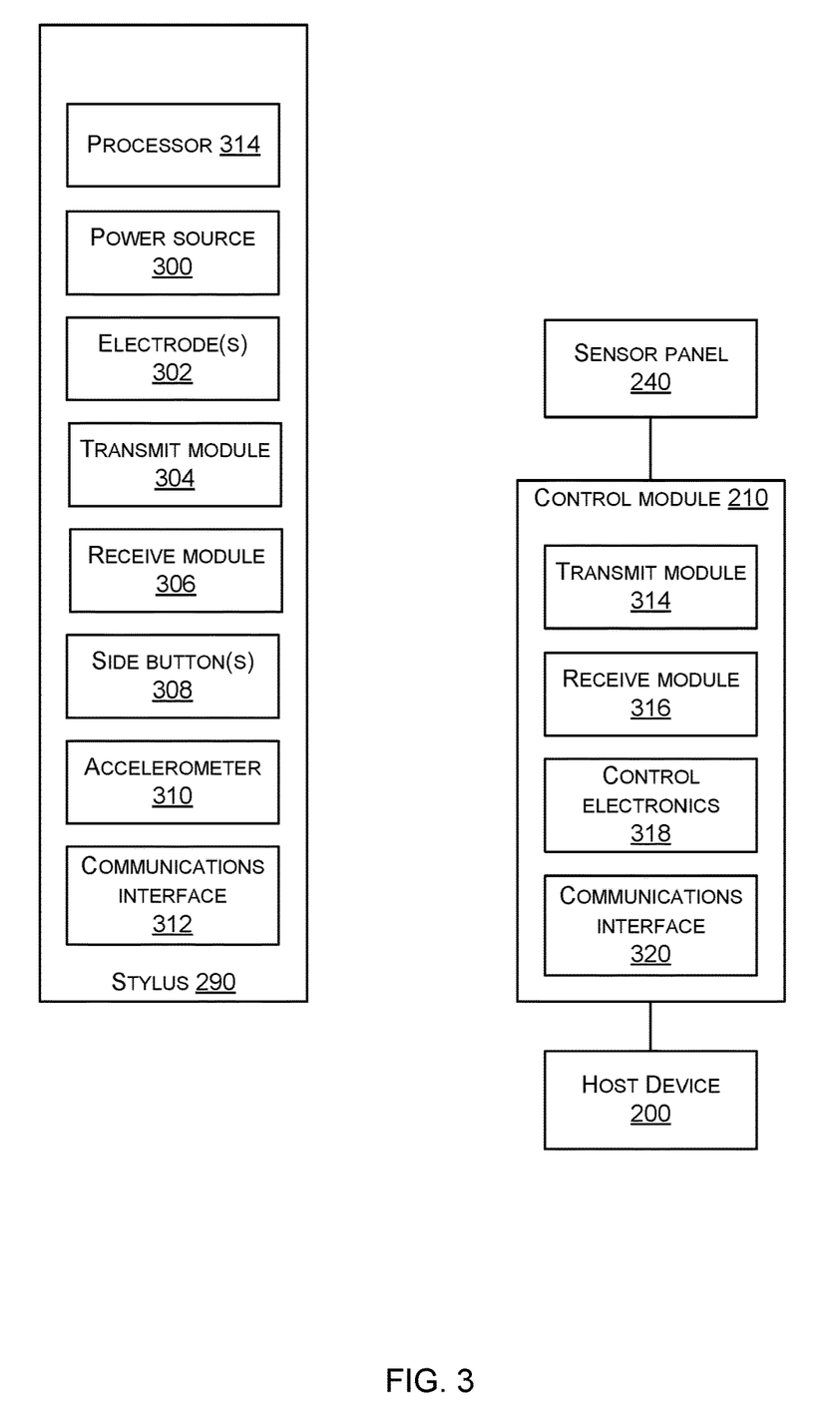
FIG. 3 is a schematic diagram of the stylus of FIG. 2 in more detail and showing a control module of the electronic device in more detail.

FIG. 3 is a schematic diagram of a stylus or pen 290 together with a sensor panel 240, a control module 210 and a host device 200. The host device is the electronic device 200 of FIG. 2. The control module 210 is the control module of FIG. 1 with more detail shown. The sensor panel 240 is a capacitive sensor panel such as that described with reference to FIG. 1.

In the example of FIG. 3 the stylus is a powered stylus having a power source 300. However, it is also possible to use a passive stylus which does not have its own power source but which has electronic components such as a parasitic antenna, or to use a conventional pen which has no power source or electronic components.

The stylus 290 includes a transmit module 304 and a receive module 306 in the example of FIG. 3. However, in some implementations the stylus does not include one or both of the transmit module 304 and the receive module 306. The stylus has a body approximately the size and shape of a pen or pencil having a tip which is pressure sensitive in some examples. One or more electrodes 302 (also referred to herein as transmitters) are in the body of the stylus, such as one at the tip and optionally one at the tail and optionally one at a tilt point of the stylus which is a point intermediate between the tip and the tail. The stylus has a processor 314 for controlling the transmit and receive modules 304, 306 in the stylus 290. In some cases the stylus has a memory (not shown). In some cases the stylus body incorporates an accelerometer 310 which senses orientation of the stylus and the communications interface 312 is configured to transmit the sensed orientation to the communications interface 320 of the control module 210. In some cases the stylus has one or more side buttons 308 which may be depressed by a user of the stylus. When a side button 308 is depressed by a user information about the button press event may be sent from communications interface 312 to communications interface 320 of the control module. In some examples, when a side button 308 is depressed by a user the frequency of operation of one or more of the electrodes 302 is altered. The stylus 290 has a power source 300 such as a battery or wired connection to an external power supply.

The tip of the stylus is made of electrically conductive material. For example, it is made from metal wire or foil or machined from solid metal stock. In some examples the stylus has a tapered tip.

The control module 210 comprises a transmit module 314 and a receive module 316. The transmit modules and receive modules of the stylus and the control module 210 comprise analog circuitry and circuitry for converting between analog and digital signals. The analog circuitry of the transmit and receive modules includes circuitry wired to the electrode(s) 302 of the stylus and/or the electrodes of the sensor panel 240. The analog transmit circuitry is configured to transmit a voltage to the electrodes of the sensor panel electrostatically by applying a time-varying voltage to the one or more of the stylus electrodes 302 and/or to the transmit electrodes of the sensor panel.

The analog receive circuitry of the stylus is configured to receive and measure a time-varying current from the conductors of the sensor panel electrostatically by maintaining the tip at a constant (i.e. a non-time-varying) voltage and measuring the current in to the tip. A processor 314 in the stylus 290 may sequence these operations and use communication interface 312 such as a wireless transmitter or transceiver to wirelessly communicate with communications interface 320 at the control module 210. The communications interface 320 at the control module 210 is a wireless receiver and transmitter for example. In other examples the stylus 290 has a wired connection to the control module 210.

The analog receive circuitry of the control module 210 is configured to receive and measure a time-varying current from the conductors of the sensor panel electrostatically. The analog receive circuitry comprises an analog to digital converter.

The control electronics 318 of the control module 210 comprises circuitry for converting from a time domain to a frequency domain and circuitry for converting from a frequency domain to a time domain. The control electronics 318 is configured to compute a position of any touch detected by the sensor panel 240. The control electronics 318 is configured to carry out the state transitions of FIG. 4 as described below in more detail and to carry out the method of FIG. 5 as described in more detail below.

In some examples the control electronics 318 comprises one or more hardware logic components in addition to analog to digital converters, digital to analog converters, and converters for converting between time and frequency domains. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). In some examples the control electronics 318 is implemented at least in part using software executing on a processor.

Figure 4:
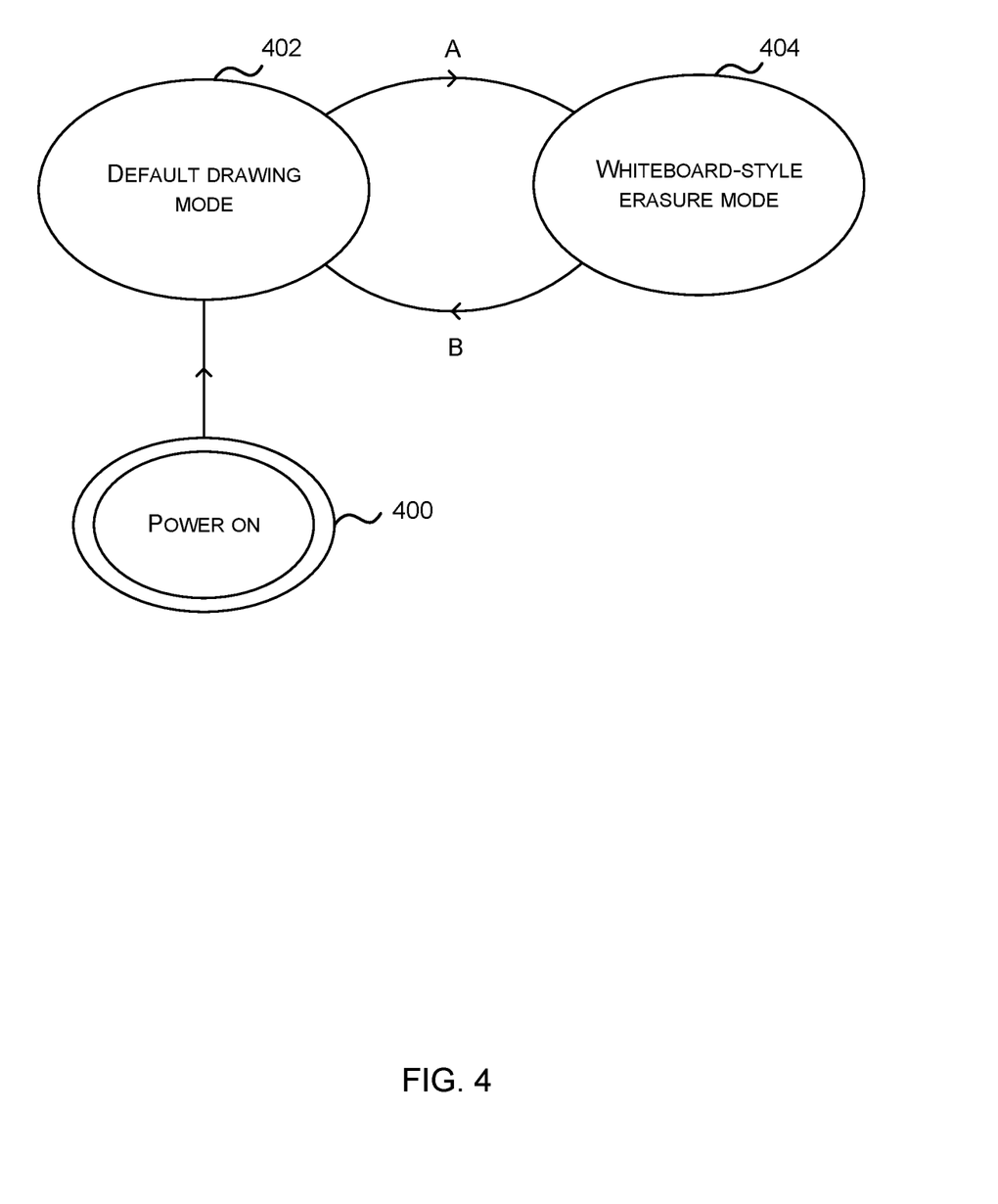
FIG. 4 is a state transition diagram of three states of the control module of FIG. 2.

FIG. 4 is a state transition diagram of three states of the control module of FIG. 2. An initial state 400 occurs when the host electronic device 200 is powered on. At this point the control module 210 enters a default drawing mode 402 in which the control module 210 interprets touch input from a tip of the stylus 290 as drawing input and triggers update of the display to create electronic ink related to the computed position of the tip of the stylus 290 on the sensor panel 240. In the default drawing mode 402 the control module 210 optionally interprets touch input from a tail of the stylus as a command to delete electronic ink at or around the computed position of the tail of the stylus 290 on the sensor panel.

When specified conditions are met the control module 210 transitions from the default drawing mode state 402 to a whiteboard-style erasure mode 404. During the whiteboard-style erase mode the control module 210 triggers update of the display to delete or edit content in a region of the display related to a position of a longitudinal axis of the stylus on the touch panel sensor.

The control module 210 monitors for the specified conditions and if one or more of these are detected it transitions to the whiteboard-style erase mode 404. Various different examples of specified conditions are now described and it is understood that these are a non-exhaustive list of examples and that combinations of one or more of these specified conditions are used in some cases. A non-exhaustive list of example specified conditions is: user input at the stylus, user input at the host electronic device 200, detection of substantially parallel orientation of a longitudinal axis of the stylus with respect to the sensor panel surface. A variety of different types of user input at the stylus may be used such as one or more of, voice input, button press, accelerometer signals produced during gesture motion of the stylus or others. A variety of different types of user input at the host electronic device 200 may be used such as one or more of: audio input, touch input, gesture input, mouse input, keyboard input.

In the case where the specified conditions comprise a substantially or generally parallel orientation of the longitudinal axis of the stylus with respect to the sensor panel surface, this is detected in one or more ways. For example, in the case that the stylus contains a tilt point transmitter and a tip transmitter, a tilt angle is computed by the control module which is an angle between the stylus and the surface of the sensor panel. If the tilt angle is below a threshold then the stylus is determined to be substantially parallel to the surface of the sensor panel. In another example, a location of a first point on the stylus and a second point on the stylus are detected on the sensor panel. If these points are found to be touching the sensor panel and the points are greater than a specified distance apart, the stylus is detected as having its body generally parallel to the sensor panel surface. In this case the stylus is either a conventional pencil or pen with no electronics, or it is a powered or passive stylus with electronics. More examples of ways of detecting that the stylus is generally parallel with the sensor panel surface are described later in this document.

In some cases, the control module 210 transitions back, from the whiteboard-style erasure mode 404 to the default drawing mode 402 when the absence of the specified conditions used for the transition A in FIG. 4 is observed for a time interval. This gives a simple and effective way to control the modes of operation of the control module 210 and thus how data is input to the host electronic device 200.

In some cases the control module 210 transitions back, from the whiteboard-style erasure mode 404 to the default drawing mode 402 when specified conditions occur. For example, user input made at the stylus, user input made at the host electronic device 200, motion of the stylus in a predefined gesture, orientation of the stylus with respect to the sensor panel in a specified manner.

Figure 5:
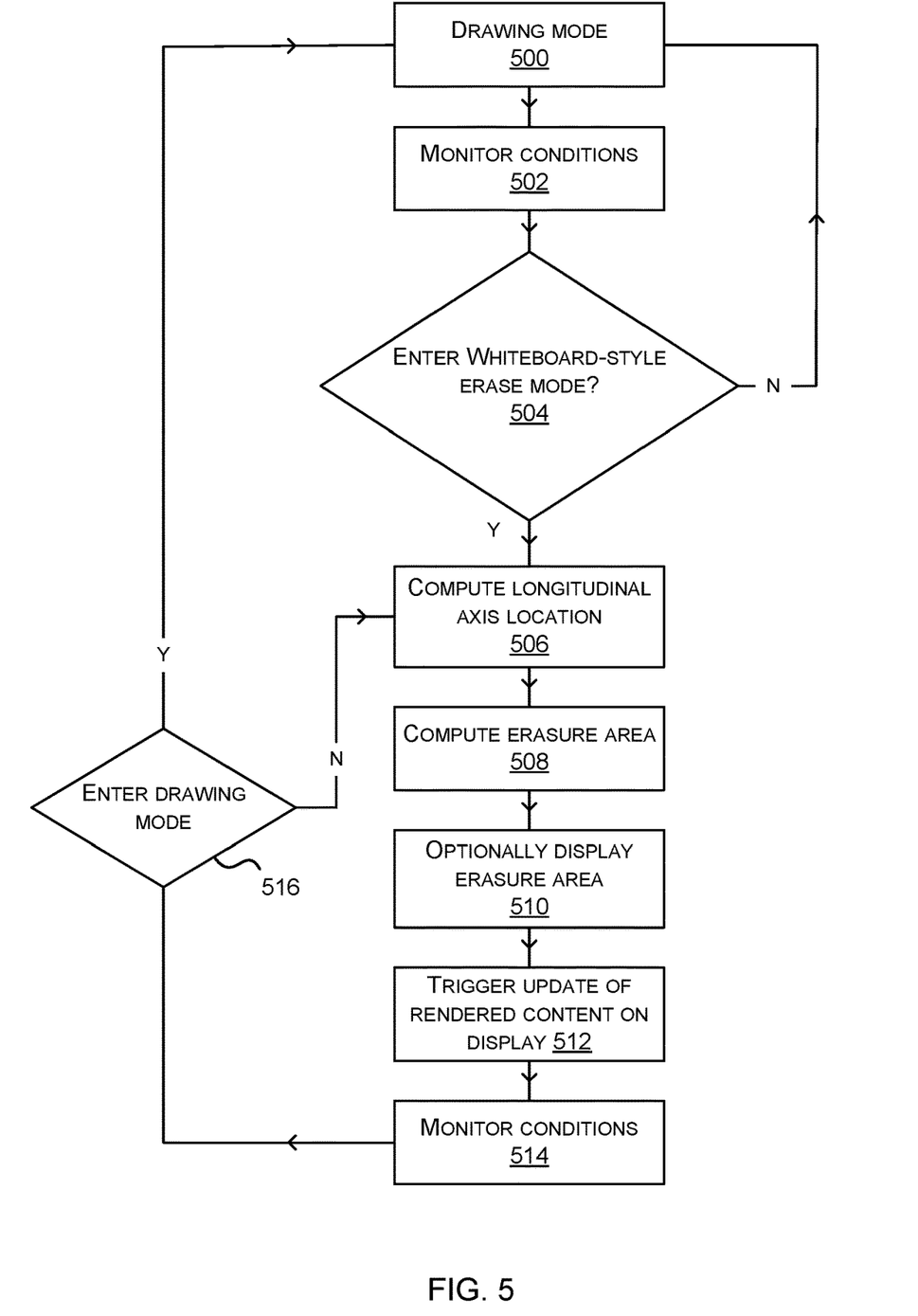
FIG. 5 is a flow diagram of a method of operation at the control module of FIG. 2.

FIG. 5 is a flow diagram of a method of operation at the control module 210. The control module 210 begins in a drawing mode 500 which is the default drawing mode 402 of FIG. 4. The control module 210 monitors 500 for specified conditions as described above with reference to FIG. 4 and checks 504 whether to enter a whiteboard-style erase mode. If the specified conditions are observed the control module enters the whiteboard-style erase mode 504 and proceeds to compute 506 a location of a longitudinal axis of the stylus on the sensor panel.

The location of the longitudinal axis of the stylus on the sensor panel is found by detecting a first position on the sensor panel of a first point on a stylus, detecting a second position on the sensor panel of a second point on the stylus, the second point being spaced from the first point; and computing the location of the longitudinal axis of the stylus on the sensor panel from at least the detected first and second positions. The first and second points on the stylus are spaced from one another and may be a tip of the stylus and a tail of the stylus, or a tip of the stylus and a tilt point of the stylus, or any other two stylus points which are spaced apart from one another. A tilt point of a stylus is a point on the stylus which is intermediate between the tip and the tail of the stylus.

In some examples the location of the longitudinal axis of the stylus on the sensor panel is computed by searching near the positions of the two points for a linear arrangement of sensed touch positions. This enables the longitudinal axis location to be found in the case of a conventional pencil or stylus with no electronics in it.

In some examples the location of the longitudinal axis of the stylus on the sensor panel is computed by identifying one of the points on the stylus as being either a tip or a tail of the stylus and by knowing a length of the stylus. For example, one of the points on the stylus is identified as being a tip or a tail of the stylus by detecting a signal known to be from a transmitter in the tip, or a transmitter in the tail of the stylus. In this way two positions are found and known to be on the stylus, one of the positions is known to be a tip or tail of the stylus, using interpolation between the points and the knowledge of the length of the stylus it is then possible to compute the position of the longitudinal axis of the stylus on the sensor panel.

In some examples the location of the longitudinal axis of the stylus on the sensor panel is computed by identifying one of the points on the stylus as being a tip and by identifying the other point as being the tail of the stylus. In this case the position of the longitudinal axis of the stylus is computed as the line between the two positions. For example, the stylus may contain a transmitter which transmits at the tip which transmits a known tip signal and it may also contain a transmitter at its tail which transmits a known tail signal.

Once the longitudinal axis location has been computed, the control module computes an erasure area 508 related to the longitudinal axis location. The erasure area contains the longitudinal axis location in some examples. This gives the benefit of intuitive control of the electronic device 200. In some examples the erasure area is a rectangle around the longitudinal axis. This gives the benefit that a user is able to erase larger areas using less input. In some examples the erasure area is displayed 510 on the display such as using a dotted rectangle (see 110 of FIG. 1) before any erase actually occurs so that a user is able to preview the area which will be erased. In this case, if the user makes an input such as a button press on the stylus or other user input the previewed area proceeds to be erased. This is done by the control module 210 triggering 513 update of rendered content on the display. The control module 210 sends a message to an operating system or renderer of the electronic device 200 in order to update the rendered content on the display.

The control module 210 continues to monitor 514 conditions and checks 516 whether to enter the drawing mode as described above with reference to FIG. 4. The process of FIG. 5 repeats as indicated by the arrows in FIG. 5 so that as the stylus moves the location of the longitudinal axis is re-computed and the erasure area updated. In this way a user is able to slide the stylus body over the sensor panel in order to erase electronic ink as illustrated in FIG. 1. This is achieved in a natural and intuitive manner which reduces burden of user input to the electronic device 200.

Figure 6A:
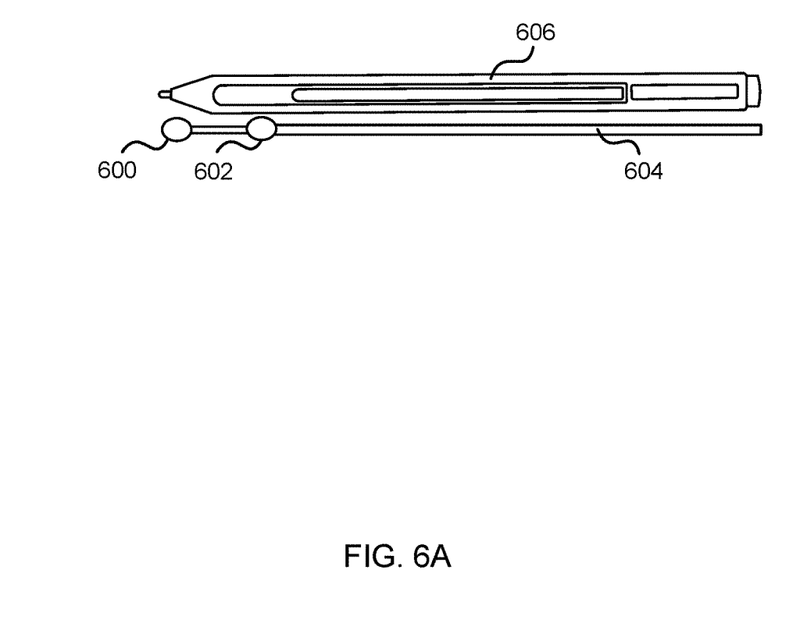
FIG. 6A is a side view of a stylus and a sensor panel where the stylus is lying on the sensor panel.

FIG. 6A is a side view of a stylus 606 and a sensor panel 604 where the stylus 606 is lying on the sensor panel 604. The stylus contains a transmitter at its tip which transmits a first signal and it contains a second transmitter at a tilt point of the transmitter which transmits a second signal, different from the first signal. The sensor panel and/or control module detect the location on the sensor panel 600 of the tip of the stylus using the first signal. The sensor panel and/or control module detect the location on the sensor panel 600 of the tilt point 602 of the stylus using the second signal. The control module knows the length of the stylus and is thus able to extrapolate the locations 600 and 602 to compute the position of the longitudinal axis of the stylus.

Figure 6B:
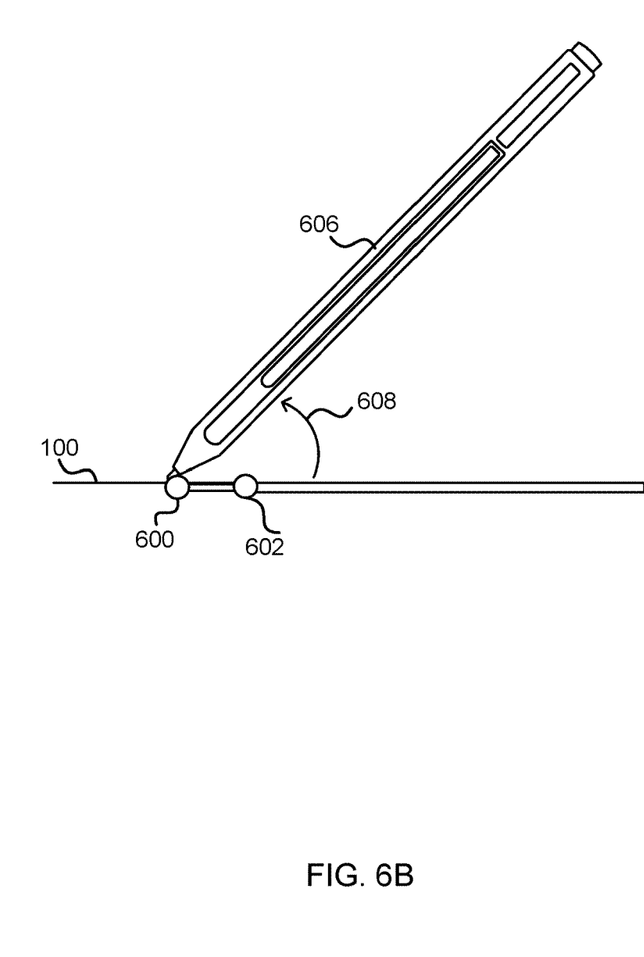
FIG. 6B is another side view of a stylus and a sensor panel in which the stylus is tilted at approximately 45 degrees to the sensor panel.

FIG. 6B is another side view of the stylus 606 and a sensor panel 100 in which the stylus 606 is tilted at approximately 45 degrees to the sensor panel as indicated by angle 608. The location of the tilt point 602 and the tip 600 is detected using the sensor panel 100 and by triangulation the angle 608 is computed, since the distance from the tip of the stylus to the transmitter associated with the tilt point is known.

In some examples, where there are two transmitters in the stylus 290, these are arranged to transmit different signals during the drawing mode and to transmit the same signal during the whiteboard-style erase mode. In this case, when the control module 210 detects the same signal being transmitted from two different locations in the stylus, it knows to transition to the whiteboard-style erase mode. Therefore the specified conditions for transitioning to whiteboard-style erase mode are detection of the same signal transmitted from two different locations on the stylus in some cases. For example, if a user presses a button on the stylus to initiate whiteboard-style erase mode, the stylus makes the two transmitters in the stylus transmit the same signal. This gives a fast, efficient and effective way to transition to white-board style erase mode. To move back to drawing mode, the user presses the button on the stylus again and this makes the stylus transmit different signals on the two transmitters.

Figure 7:
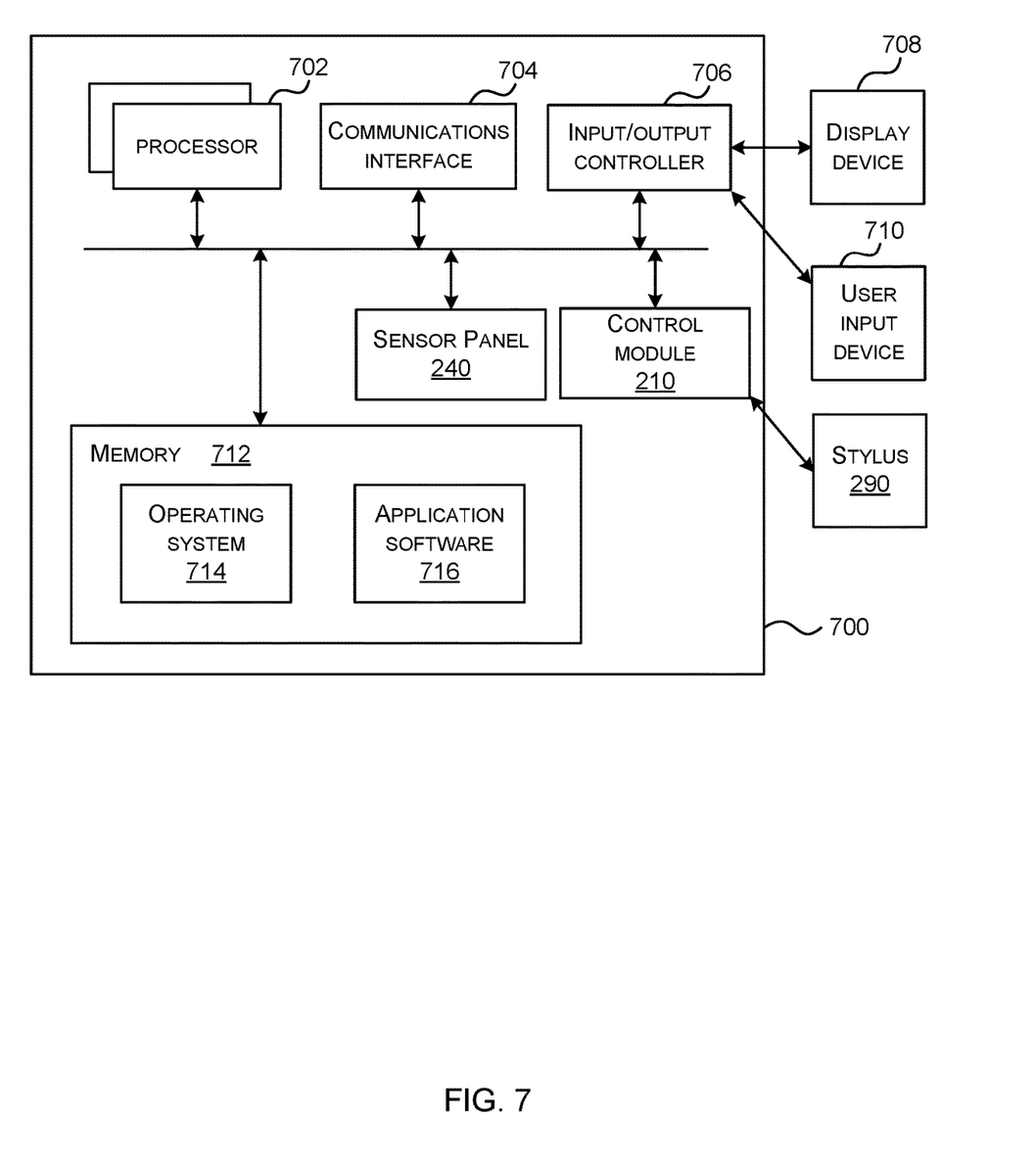
FIG. 7 illustrates an exemplary computing-based device in which embodiments of a control module and sensor panel are implemented.

FIG. 7 illustrates various components of an exemplary computing-based device 700 which are implemented as any form of a computing and/or electronic device, and in which embodiments of a control module 210 and sensor panel 240 for use with a stylus 290 are implemented in some examples.

Computing-based device 700 comprises one or more processors 702 which are microprocessors, controllers or any other suitable type of processors for processing computer executable instructions to control the operation of the device in order to detect specified conditions, enter a whiteboard-style erase mode, compute position of a longitudinal axis of a stylus on a sensor panel, and update a display on the basis of the computed position. In some examples, for example where a system on a chip architecture is used, the processors 702 include one or more fixed function blocks (also referred to as accelerators) which implement a part of the method of any of FIGS. 4 and 5 in hardware (rather than software or firmware). Platform software comprising an operating system 714 or any other suitable platform software is provided at the computing-based device to enable application software 716, such as electronic ink drawing software, to be executed on the device. The computing-based device has a sensor panel 240 as described above with reference to FIG. 2 and a control module 210 as described above with reference to FIGS. 2 and 3. The control module 210 is configured to interoperate with a stylus 290 which is a conventional pencil or pen without electronics, or a powered or passive stylus having electronics.

The computer executable instructions are provided using any computer-readable media that is accessible by computing based device 700. Computer-readable media includes, for example, computer storage media such as memory 712 and communications media. Computer storage media, such as memory 712, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 712) is shown within the computing-based device 700 it will be appreciated that the storage is, in some examples, distributed or located remotely and accessed via a network or other communication link (e.g. using communication interface 704).

The computing-based device 700 also comprises an input/output controller 706 arranged to output display information to a display device 708 which may be separate from or integral to the computing-based device 700. The display information may provide a graphical user interface. The input/output controller 706 is also arranged to receive and process input from one or more devices, such as a user input device 710 (e.g. a mouse, keyboard, camera, microphone or other sensor). In some examples the user input device 710 detects voice input, user gestures or other user actions and provides a natural user interface (NUI). This user input may be used to make the control module 210 transition between operating modes, or for other purposes. In an embodiment the display device 708 also acts as the user input device 710 if it is a touch sensitive display device. The input/output controller 706 outputs data to devices other than the display device in some examples, e.g. a locally connected printing device (not shown in FIG. 7).

Any of the input/output controller 706, display device 708 and the user input device 710 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An electronic device comprising:
a sensor panel;
a display upon which content is rendered in use;
a control module controlling the sensor panel, and which enters a whiteboard-style erase mode when specified conditions are met;
the control module being configured to, in the whiteboard-style erase mode,
detect a first position on the sensor panel of a first point on a stylus,
detect a second position on the sensor panel of a second point on the stylus, the second point being spaced from the first point;
compute the location of the longitudinal axis of the stylus on the sensor panel from at least the detected first and second positions; and
trigger an update of the rendered content at a location on the display related to the location of the longitudinal axis of the stylus on the sensor panel.

In this way an effective, efficient and intuitive way of erasing electronic ink or other content on a display of an electronic device is achieved in a manner which reduces burden on the end user. This is especially the case for large displays such as electronic whiteboards. This approach works for a wide variety of styluses including those with and those without electronics.

The electronic device described above wherein the control module is configured to detect the specified conditions for entering the whiteboard-style erase mode by receiving a signal indicating a detected voice command. This gives a fast and effective way to transition the modes of the control module.

The electronic device described above wherein the control module is configured to detect the specified conditions for entering the whiteboard-style erase mode as a result of a signal received from the stylus indicating a button press made by a user at the stylus. Using a button press at the stylus is an effective and robust way of transitioning to the whiteboard-style erase mode. There is little risk of unintentionally transitioning to whiteboard-style erase mode.

The electronic device described above wherein the control module is configured to detect the specified conditions for entering the whiteboard-style erase mode by receiving sensed data indicating that the longitudinal axis of the stylus is substantially parallel to a surface of the display. This enables the control module to transition between modes automatically without user input which reduces burden on the user.

The electronic device described above wherein the control module is configured to receive the sensed data comprising sensed data of an accelerometer in the stylus. This gives an accurate and robust way of telling when to enter whiteboard-style erase mode, which does not require user input.

The electronic device described above wherein the control module is configured to detect the specified conditions for entering the whiteboard-style erase mode by detecting on the sensor panel, both a tip of the stylus and an end of the stylus opposite the tip of the stylus. This is an automatic way of entering whiteboard-style erase mode which reduces burden on the user.

The electronic device described above wherein the control module is configured to detect the specified conditions for entering the whiteboard-style erase mode by detecting a tilt angle between the longitudinal axis of the stylus and the sensor panel and by comparing the tilt angle with a threshold. This is another automatic way of entering whiteboard-style erase mode and it provides an accurate result that is unlikely to misinterpret sensed data at the sensor panel such as noise or touch input from fingers of a user as being a stylus lying on the sensor panel.

The electronic device described above wherein the control module is configured to detect a stylus tip signal transmitted from a tip of the stylus when the stylus tip is hovering over or touching the sensor panel and wherein the control panel is configured to detect the specified conditions for entering the whiteboard-style erase mode by using at least the detected stylus tip signal. By having a stylus tip signal the control panel is able to tell which touch signal at the sensor panel is from the stylus tip and this contributes to being able to accurately find whether the stylus is approximately parallel to the surface of the sensor panel.

The electronic device described above wherein the control module is configured to receive a stylus tip signal from a tip of the stylus and a stylus tail signal from a tail of the stylus, when the stylus is hovering over or touching the sensor panel, and to detect the specified conditions for entering the whiteboard-style erase mode by using at least the stylus tip signal and the stylus tail signal. This gives a very accurate and robust way of finding whether the stylus is roughly parallel to the surface of the sensor panel.

The electronic device described above wherein the control module is configured to detect whether the stylus tip signal and the stylus tail signal are the same, and if so, to enter the whiteboard-style erase mode. For example, where the user has pressed a button on the stylus, or made a voice command, the stylus makes the signals the same so that the control module can detect this and move into whiteboard-style erase mode. This is a robust and effective way of control.

The electronic device described above wherein the control module is configured to receive a stylus tilt point signal from a point of the stylus intermediate between a tip and a tail of the stylus, when the stylus is hovering over or touching the sensor panel, and to detect the specified conditions for entering the whiteboard-style erase mode by using at least the stylus tilt point signal. This enables the control module to detect that the stylus is approximately parallel to the sensor panel with a degree of tolerance, where the degree of tolerance is controllable, for example, according to a size of a threshold with which the tilt point signal is compared.

The electronic device described above wherein the control module is configured to receive a stylus tilt point signal from a point of the stylus intermediate between a tip and a tail of the stylus, and also to receive a stylus tip signal from a tip of the stylus, when the stylus is hovering over or touching the sensor panel, and to detect the specified conditions for entering the whiteboard-style erase mode by using the stylus tip signal and the stylus tilt point signal. In this case positions of two points on the stylus are found and can be used, together with a known length of the stylus, to compute a position of a longitudinal axis of the stylus on the sensor panel.

The electronic device described immediately above wherein the control module is configured to detect whether the stylus tilt point signal and the stylus tip signal are the same, and if so, to enter the whiteboard-style erase mode. This provides a robust way for the stylus to inform the control module that the whiteboard-style erase mode is to be entered.

The electronic device described above wherein the control module is configured to trigger an update of the rendered content at a location on the display corresponding to a rectangular region around the computed position on the sensor panel of the longitudinal axis of the stylus. This enables more content to be updated for less user input and it enables intuitive update of the content.

A control module of a host electronic device having a display, the control module comprising:
control electronics configured to control a sensor panel associated with the display, and to enter a whiteboard-style erase mode when specified conditions are met;
the control electronics being configured to, in the whiteboard-style erase mode:
detect a position on the sensor panel of a first point on a stylus;
detect a position on the sensor panel of a second point on the stylus, the second point being spaced from the first point;
compute the location of the longitudinal axis of the stylus on the sensor panel using at least the detected position of the first point and the detected position of the second point; and
trigger update of rendered content at a location on the display related to the location of the longitudinal axis of the stylus on the sensor panel.

The control electronics works with a stylus which has electronics in it, or with a conventional pencil or pen. The control electronics enables effective control of a host electronic device.

A method at a control module of a sensor panel in a host electronic device having a display, the method comprising:
entering a whiteboard-style erase mode when specified conditions are met and when in the whiteboard-style erase mode:
detecting a position on the sensor panel of a first point known to be on a stylus;
detecting a position on the sensor panel of a second point known to be on the stylus, the second point being spaced from the first point;
computing the location of the longitudinal axis of the stylus on the sensor panel using at least the detected position of the first point and the detected position of the second point; and
triggering update of rendered content at a location on the display related to the location of the longitudinal axis of the stylus on the sensor panel.

The method described above wherein detecting a position on the sensor panel of a first point known to be on a stylus comprises receiving a stylus tip signal transmitted from a tip of a stylus.

The method described above wherein detecting a position on the sensor panel of a second point known to be on the stylus comprises receiving a second signal different from the stylus tip signal transmitted from another point on the stylus.

The method described above comprising displaying, at the display, a rectangle around a corresponding location of the longitudinal axis of the stylus on the sensor panel, the rectangle indicating an erasure area of the display to be updated. This enables the user to tell what will be erased before the erasing happens.

The method described above comprising receiving a user input indicating that the erasure area of the display is to be updated, and updating the display accordingly. This enables a user to have greater control over what is erased and reduces the possibility of content being erased unintentionally.

A control module of a sensor panel in a host electronic device having a display, the control module comprising:
means for entering a whiteboard-style erase mode when specified conditions are met and when in the whiteboard-style erase mode:
means for detecting a position on the sensor panel of a first point known to be on a stylus;
means for detecting a position on the sensor panel of a second point known to be on the stylus, the second point being spaced from the first point;
means for computing the location of the longitudinal axis of the stylus on the sensor panel using at least the detected position of the first point and the detected position of the second point; and means for triggering update of rendered content at a location on the display related to the location of the longitudinal axis of the stylus on the sensor panel.

The elements of the control module illustrated in FIG. 3, such as when encoded to perform the operations illustrated in FIGS. 4 and/or 5, constitute exemplary means for entering a whiteboard-style erase mode, means for detecting a position of a first point, means for detecting a position of a second point and means for sending a signal to the host computing device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An electronic device comprising:
a sensor panel;
a display upon which content is rendered in use;
a control module controlling the sensor panel, and which enters a whiteboard-style erase mode when specified conditions on a stylus are met, the specified conditions comprising a button on the stylus being pressed and a tip signal of the stylus and a tail signal of the stylus transmitting a same signal as a result of the button on the stylus being pressed; and
the control module being configured to:
receive the tip signal of the stylus and the tail signal of the stylus;
detect that the tip signal of the stylus and the tail signal of the stylus have transmitted the same signal;
based on the detecting, determine that the specified conditions have been met; and
upon determining the specified condition have been met, enter the whiteboard-style erase mode, and in the whiteboard-style erase mode:
detect a first position on the sensor panel of a first point on a stylus;
detect a second position on the sensor panel of a second point on the stylus, the second point being spaced from the first point to create an erasure area between the first point and the second point;
compute the location of the longitudinal axis of the stylus on the sensor panel from at least the detected first and second positions; and
delete one or more portions of the rendered content within the erasure area at a location on the display related to the location of the longitudinal axis of the stylus on the sensor panel.

2. The electronic device of claim 1 wherein the control module is configured to detect the specified conditions for entering the whiteboard-style erase mode by further receiving sensed data indicating that the longitudinal axis of the stylus is substantially parallel to a surface of the display.

3. The electronic device of claim 2 wherein control module is configured to receive the sensed data comprising sensed data of an accelerometer in the stylus.

4. The electronic device of claim 1 wherein the control module is configured to detect the specified conditions for entering the whiteboard-style erase mode by detecting on the sensor panel, both a tip of the stylus and an end of the stylus opposite the tip of the stylus.

5. The electronic device of claim 1 wherein the control module is configured to further detect the specified conditions for entering the whiteboard-style erase mode by detecting a tilt angle between the longitudinal axis of the stylus and the sensor panel and by comparing the tilt angle with a threshold.

6. The electronic device of claim 1 wherein the control module is configured to detect the tip signal of the stylus and the tail signal of the stylus when the stylus tip is hovering over or touching the sensor panel.

7. The electronic device of claim 1 wherein the control module is configured to receive the tip signal of the stylus and the tail signal of the stylus when the stylus is touching the sensor panel.

8. The electronic device of claim 1 wherein the control module is configured to receive the tip signal of the stylus and the tail signal of the stylus.

9. The electronic device of claim 1 wherein the control module is configured to receive a stylus tilt point signal the stylus, when the stylus is hovering over or touching the sensor panel, and to further detect the specified conditions for entering the whiteboard-style erase mode by using at least the stylus tilt point signal.

10. The electronic device of claim 1 wherein the control module is configured to receive a stylus tilt point signal from a point of the stylus intermediate between a tip and a tail of the stylus when the stylus is hovering over or touching the sensor panel, and to detect the specified conditions for entering the whiteboard-style erase mode by further using the stylus tilt point signal.

11. The electronic device of claim 10 wherein the control module is further configured to detect whether the stylus tilt point signal and the stylus tip signal are the same, and if so, to enter the whiteboard-style erase mode.

12. The electronic device of claim 1 wherein the control module is configured to trigger an update of the rendered content at a location on the display corresponding to a rectangular region around the computed position on the sensor panel of the longitudinal axis of the stylus.

13. A host electronic device with a control module, the control module comprising:
control electronics configured to:
control a sensor panel associated with a display;
receive the tip signal of the stylus and the tail signal of the stylus;
detect that the tip signal of the stylus and the tail signal of the stylus have transmitted the same signal;
based on the detecting, determine that specified conditions have been met; and
upon determining that the specified conditions have been met, enter a whiteboard-style erase mode when specified conditions on a stylus are met, the specified conditions comprising a button on the stylus being pressed and the tip signal of the stylus and the tail signal of the stylus transmitting the same signal as a result of the button on the stylus being pressed;
the control electronics being further configured to, in the whiteboard-style erase mode:
detect a position on the sensor panel of a first point on a stylus;
detect a second position on the sensor panel of a second point on the stylus, the second point being spaced from the first point to create an erasure area between the first point and the second point;
compute the location of the longitudinal axis of the stylus on the sensor panel using at least the detected position of the first point and the detected position of the second point; and
delete one or more portions of rendered content within the erasure area at a location on the display related to the location of the longitudinal axis of the stylus on the sensor panel.

14. A method at a control module of a sensor panel in a host electronic device having a display, the method comprising:
receive a tip signal of a stylus and a tail signal of the stylus;
detect that the tip signal of the stylus and the tail signal of the stylus have transmitted the same signal;
based on the detecting, determining that specified conditions have been met, the specified conditions comprising a button on the stylus being press and the tip signal of the stylus and the tail signal of the stylus transmitting the same signal as a result of the button on the stylus being pressed;
upon determining the specified condition have been met, entering a whiteboard-style erase mode; and
when in the whiteboard-style erase mode:
detecting a position on the sensor panel of a first point known to be on a stylus;
detecting a second position on the sensor panel of a second point known to be on the stylus, the second point being spaced from the first point to create an erasure area between the first point and the second point;
computing the location of the longitudinal axis of the stylus on the sensor panel using at least the detected position of the first point and the detected position of the second point; and
deleting one or more portions of rendered content within the erasure area at a location on the display related to the location of the longitudinal axis of the stylus on the sensor panel.

15. The method of claim 14 wherein detecting a position on the sensor panel of a first point known to be on a stylus comprises receiving the tip signal transmitted from a tip of the stylus.

16. The method of claim 15 wherein detecting a second position on the sensor panel of a second point known to be on the stylus comprises receiving a second signal different from the style s tip signal transmitted from another point on the stylus.

17. The method of claim 14 comprising displaying, at the display, a rectangle around a corresponding location of the longitudinal axis of the stylus on the sensor panel, the rectangle indicating an erasure area of the display to be updated.

18. The method of claim 17 comprising receiving a user input indicating that the erasure area of the display is to be updated, and updating the display accordingly.

19. The method of claim 14, wherein the control electronics is configured to further detect the specified conditions for entering the whiteboard-style erase mode by detecting a tilt angle between the longitudinal axis of the stylus and the sensor panel and by comparing the tilt angle with a threshold.

20. The method of claim 14, wherein the control electronics is configured to detect the specified conditions for entering the whiteboard-style erase mode by further receiving sensed data indicating that the longitudinal axis of the stylus is substantially parallel to a surface of the display.

* * * * *